3,100,681
PURIFICATION OF URANIUM ORE
CONCENTRATES
Robert V. Townend, Morris Township, Morris County, N.J., Horace Q. Trout, Brooklyn, N.Y., and John E. Wilkalis, Newark, N.J., assignors to Allied Chemical Corporation, New York, N.Y., a corporation of New York
Filed Feb. 10, 1960, Ser. No. 7,918
8 Claims. (Cl. 23—14.5)

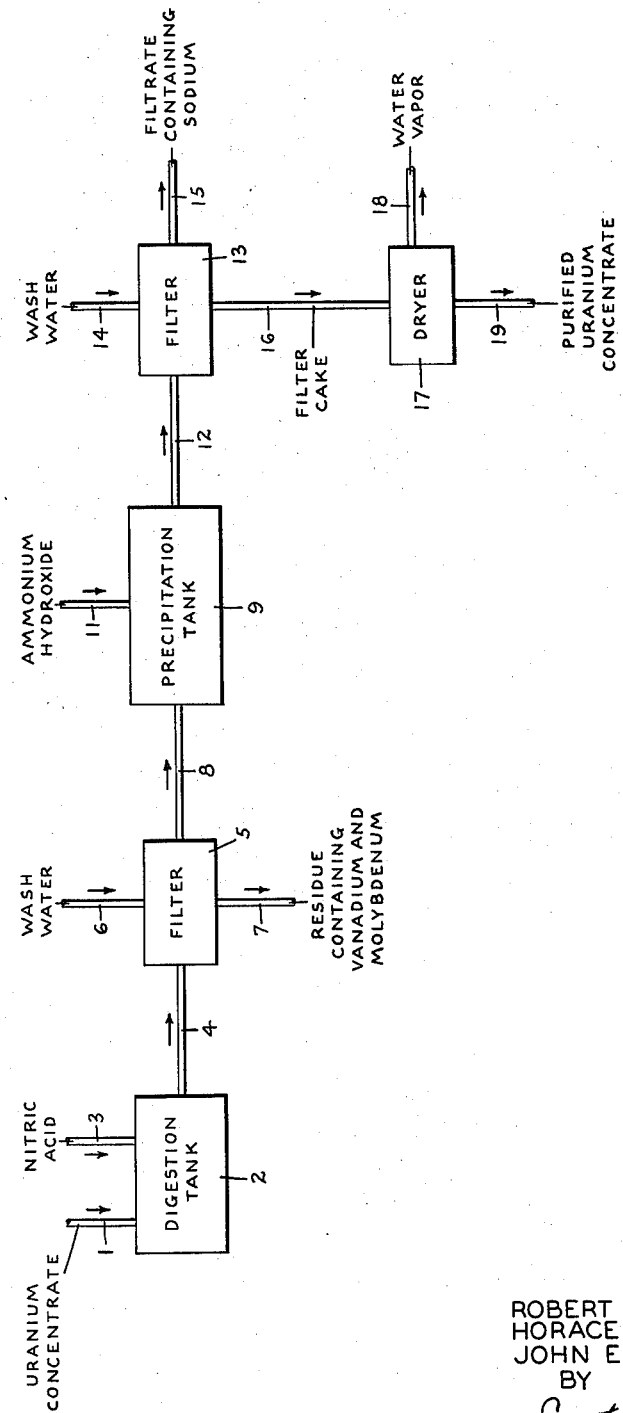

This invention relates to a process for purification of uranium ore concentrates, and more particularly relates to a process for removal of undesired sodium, vanadium and molybdenum from uranium ore concentrates obtained by soda leaching of the ore to isolate uranium oxide values.

The principal object of the invention is to provide a means of obtaining a high percentage recovery of the uranium in the concentrates treated, together with substantial removal of sodium, vanadium and molybdenum.

Other objects and advantages of the process will be apparent from the following description.

Uranium hexafluoride may be prepared directly from concentrates rich in uranium oxide values. These concentrates generally comprise ammonium uranate and/or uranium oxides ($UO_3$ to $U_3O_8$). The concentrates are subjected to gaseous reduction to form uranium dioxide, hydrofluorination to form uranium tetrafluoride, and fluorination to produce the desired uranium hexafluoride. The product is then purified by distillation procedure. In this process, it is difficult to utilize certain types of uranium concentrates because of the interference of impurities contained therein, primarily sodium, vanadium and molybdenum.

We have now discovered a process whereby a large range of uranium ore concentrates containing varying quantities of sodium, vanadium and molybdenum may be purified so that they may be employed without process difficulties in the production of uranium hexafluoride.

The uranium ore concentrates contemplated in the present process are those which have been extracted from uranium-containing ores, such as carnotite-type ores, by soda leaching. In applying soda leaching to uranium-containing ores, roasting is generally resorted to if the ore contains more than 1% vanadium, otherwise the ore is leached directly with sodium carbonate. In a typical procedure, soda leaching is carried out in a pressure vessel at 100° C. and two atmospheres oxygen pressure, using about 50 grams per liter of sodium carbonate. Uranium may then be precipitated in the form of insoluble sodium uranate by adding sodium hydroxide to the carbonate solution to raise the pH above 11. Alternatively, the carbonate solution may be neutralized with an acid such as $H_2SO_4$, boiled to remove all carbon dioxide and the uranium precipitated by neutralization with ammonia. In either case, the precipitate is filtered off and dried to produce a uranium ore concentrate which is generally a yellow pulverulent material. This material contains sodium and varying quantities of impurities, including vanadium and molybdenum.

The presence of sodium in the concentrate makes the concentrate relatively easily fusible in the above-described process at temperatures at which the hydrofluorination and fluorination may be carried out. Such fusion interferes with these operations and, in some instances, even necessitates shut-down of the equipment. Vanadium oxyfluoride is extremely difficult to remove from liquid uranium hexafluoride. Moreover, molybdenum, if present, introduces additional difficulties in purification of the hexafluorine product and also consumes relatively expensive fluorine reactant.

In accordance with the present invention, an improved process for recovering uranium values from pulverulent uranium ore concentrates, which have been extracted from uranium-containing ore by soda leaching and contain undesired sodium and vanadium, comprises treating the concentrate with an aqueous nitric acid solution in sufficient amount to produce a slurry having a pH ranging from its initial minimum point to about 0.5 thereabove, thereby dissolving uranium and leaving a residue containing vanadium, and separating said residue. The resultant uranium-containing solution is then treated with sufficient aqueous ammonium hydroxide solution to precipitate substantially all of the uranium, thereby leaving sodium in solution, and the uranium precipitate containing minimal quantities of sodium and vanadium is separated as product.

When molybdenum is present in the original concentrate, it remains in the residue containing vanadium and is separated therewith from the uranium-containing solution.

It is preferred in carrying out the process of this invention to employ an aqueous nitric acid solution containing about 5 to 36% by weight $HNO_3$, and more particularly from about 10 to 20% by weight $HNO_3$. Use of higher or lower concentrations of $HNO_3$ have been found to substantially reduce the efficiency of the purification.

Moreover, it is also important to add the nitric acid solution in sufficient amount to produce a slurry having a pH ranging from its initial minimum point to about 0.5 thereabove. In this connection, we have made the surprising discovery that when aqueous nitric acid solution is added to uranium concentrates of the type contemplated, the resulting slurry attains an initial minimum pH value, usually in the range of 1.4 to 3.0, which rises upon addition or more aqueous nitric acid solution, and, finally, once again lowers. It is only at the point of the initial minimum pH value and up to about 0.5 thereabove that substantially all of the uranium goes into solution while the predominant portion of the vanadium and molydenum impurities remains undissolved.

Although the suitable pH will vary depending upon the nature of the uranium concentrate treated, the pH of the slurry will ordinarily be in the range of about 1.5 to 2.5.

In carrying out the nitric acid treatment of the present invention, temperatures of at least about 70° C., and preferably about 70° to 105° C., are employed. Although temperatures lower than 70° C. may be utilized, such temperatures do not permit optimum purification of the concentrate. Generally speaking, the treatment is carried out over a period of about ¼ to 5 hours, preferably about ½ to 1 hour.

The insoluble residue resulting from treatment of the concentrate with aqueous nitric acid solution contains about 90% or more of the vanadium and molybdenum but only about 3 to 5% of the uranium originally present in the concentrate. The residue is filtered off, and, if desired, any uranium present in the residue is recovered by suitable procedure.

The resulting filtrate containing relatively all of the uranium originally present in the concentrate may then be precipitated in conventional manner with aqueous ammonium hydroxide solution. The treatment with ammonium hydroxide solution is generally carried out at a temperature of about 25° to 70° C., preferably about 50° to 70° C., for a period of about ¼ to ½ hour. The ammonium hydroxide solution is added in sufficient amount to precipitate substantially all of the uranium as ammonium uranate, the sodium constituent remaining in solution. Generally speaking, sufficient ammonium hydroxide solution is added in order to bring the pH of the filtrate to a value in the range of about 6 to 13, and preferably about 6.4 to 6.6.

The uranium precipitate so obtained is then filtered off, washed with water and dried. The purified concentrate is rich in uranium oxide values in the form of ammonium uranate, uranium oxides or mixtures or complexes thereof and contains minimal quantities of sodium, vanadium and molybdenum.

The attached drawing illustrates a typical flow sheet or diagram showing the steps involved in purification of pulverulent uranium ore concentrates obtained by soda leaching of uranium ores. These concentrates generally contain (by weight) at least about 70% uranium as $UO_3$, about 2 to 12% sodium as $Na_2O$, about 0.1 to 2.0% vanadium as $V_2O_5$ and about 0.0002 to 1.0% molybdenum as $MoO_3$.

Referring to the drawing, the pulverulent uranium ore concentrate is charged via line 1 to digestion tank 2, provided with a suitable agitator (not shown). An aqueous nitric acid solution containing about 10 to 20% by weight $HNO_3$ is charged via line 3 to the digestion tank, and the resultant slurry is agitated at a temperature of about 70° to 105° C. for about ½ to 1 hour. Sufficient nitric acid solution is used to maintain the pH of the slurry at its initial minimum pH value up to about 0.5 thereabove. During the digestion treatment, the uranium constituent of the concentrate goes into solution and vanadium and molybedenum remain in the insoluble residue.

The slurry is then passed through line 4 to conventional filter 5. In filter 5 the residue is filtered off and is washed with water introduced through line 6. The filter cake is withdrawn from filter 5 through line 7. After drying, this cake contains about 90% or more of the vanadium and molybdenum originally present in the concentrate. The cake also contains a minor portion of the sodium originally present in the concentrate. If desired, the uranium content of the cake may be recovered by any suitable procedure.

The filtrate obtained from filter 5 is passed through line 8 to precipitation tank 9, provided with a suitable agitator (not shown). An aqueous ammonium hydroxide solution, e.g. containing about 5 to 28% by weight ammonium hydroxide, is introduced through line 11 to precipitation tank 9 and is agitated therein at a temperature of about 50° to 70° C. for about ¼ to ½ hour. Sufficient ammonium hydroxide is used to precipitate the uranium constituent of the filtrate as ammonium uranate. The sodium constituent, however, remains in solution.

The slurry in tank 9 is then passed through line 12 to conventional filter 13 where the precipitated uranium is filtered off. The filter cake is washed with water introduced to filter 13 through line 14. The sodium-containing filtrate is removed from filter 13 via line 15.

The filter cake is withdrawn from filter 13 through line 16 and sent to conventional dryer 17 where the cake is dried at a temperature of about 100° to 200° C. Water vapor is removed from dryer 17 via line 18.

Purified uranium product containing about 95 to 97% of the uranium originally present in the concentrate and minimal quantities of sodium, vanadium and molybdenum is withdrawn from the dryer through line 19. The product is rich in uranium oxide values and is especially suitable for the preparation of uranium hexafluoride.

The following example in which parts are by weight illustrates one way of carrying out the process of the present invention.

*Example*

A pulverulent uranium concentrate, prepared by soda leaching of uranium ore, contained 62.6% by weight uranium, 8.99% by weight sodium, 0.65% by weight vanadium and 60 p.p.m. molybdenum.

100 parts of the uranium concentrate were agitated with 360 parts of an aqueous nitric acid solution containing 15% by weight $HNO_3$ and about 0.2 part of a 1% by weight aqueous solution of Aerosol OT (a wetting agent comprising dioctyl sodium sulfosuccinate) at a temperature of 70° C. for about 1 hour. During this acid treatment, the pH of the material held at about 2.4, its approximate initial minimum point, The resultant slurry was filtered and washed with about 200 parts of water. Upon analysis, the residue was found to contain 56.5% by weight uranium, 0.29% by weight sodium, 7.15% by weight vanadium and 394 p.p.m. molybdenum.

The filtrate was then agitated with about 400 parts of an aqueous ammonium hydroxide solution containing 3% by weight $NH_4OH$ at room temperature for about ½ hour. The resultant slurry containing ammonium uranate was filtered and washed with water. After drying at 110° C., 85.1 parts of uranium precipitate remained. Upon analysis, this precipitate was found to contain 67.9% by weight uranium, 0.48% by weight sodium and 740 p.p.m. vanadium.

While preferred forms of the process and the reagents employed therein have been described, it is to be understood that the invention is not limited to the precise procedure described. On the contrary, the invention is not to be regarded as limited except in so far as such limitations are included within the terms of the appended claims.

We claim:

1. In a process for recovering uranium values from pulverulent uranium ore concentrates which have been prepared by soda leaching of uranium ore and contain undesired vanadium, the steps comprising adding to the concentrate an aqueous nitric acid solution in sufficient amount to maintain the resulting slurry at its initial minimum pH up to about 0.5 pH unit thereabove, thereby dissolving uranium and leaving a residue containing vanadium, and separating said residue from the uranium-containing solution.

2. In a process for recovering uranium values from pulverulent uranium ore concentrates which have been prepared by soda leaching of uranium ore and contain undesired vanadium and molybdenum, the steps comprising adding to the concentrate an aqueous nitric acid solution containing about 5 to 36% by weight $HNO_3$, said nitric acid solution being added in sufficient amount to maintain the resulting slurry at it sinitial minimum pH up to about 0.5 pH unit thereabove, thereby dissolving uranium and leaving a residue containing vanadium and molybdenum, and separating said residue from the uranium-containing solution.

3. In the process of claim 2, treating the concentrate with an aqueous nitric acid solution containing about 10 to 20% by weight $HNO_3$.

4. The process of claim 3 in which the required pH is in the range of about 1.5 to 2.5.

5. A process for recovering uranium values from pulverulent uranium ore concentrates, which have been prepared by soda leaching of uranium ore and contain undesired sodium and vanadium, which comprises adding to the concentrate an aqueous nitric acid solution containing about 5 to 36% by weight $HNO_3$, said nitric acid solution being added in sufficient amount to maintain the resulting slurry at its initial minimum pH up to about 0.5 pH unit thereabove, thereby dissolving uranium and leaving a residue containing vanadium, separating said residue, treating the uranium-containing solution so obtained with sufficient aqueous ammonium hydroxide solution to precipitate substantially all of the uranium, thereby leaving sodium in solution, and separating said uranium precipitate containing minimal quantities of sodium and vanadium.

6. A process for recovering uranium values from pulverulent uranium ore concentrates, which have been prepared by soda leaching of uranium ore and contain undesired sodium, vanadium and molybdenum, which comprises adding to the concentrate an aqueous nitric acid solution containing about 5 to 36% by weight $HNO_3$, said nitric acid solution being added in sufficient amount to maintain the resulting slurry at its initial minimum pH up to about 0.5 pH unit thereabove, thereby dissolving uranium and leaving a residue containing vanadium and molybdenum, separating said residue, treating the uranium-containing solution so obtained with sufficient aqueous ammonium hydroxide solution to precipitate substantially all of the uranium, thereby leaving sodium in solution, and separating said uranium precipitate containing minimal quantities of sodium, vanadium and molybdenum.

7. In the process of claim 6, treating the concentrate with an aqueous nitric acid solution containing about 10 to 20% by weight $HNO_3$.

8. The process of claim 7 in which the required pH is in the range of about 1.5 to 2.5.

References Cited in the file of this patent

UNITED STATES PATENTS

| | | |
|---|---|---|
| 1,065,581 | Bleeker | June 24, 1913 |
| 1,399,246 | Bleeker | Dec. 6, 1921 |
| 2,759,789 | Spiegler | Aug. 21, 1956 |
| 2,830,871 | Kaufman et al. | Apr. 15, 1958 |
| 2,849,280 | Le Baron et al. | Aug. 26, 1958 |
| 2,885,270 | Kancher et al. | May 5, 1959 |